(12) United States Patent
Mazzanti

(10) Patent No.: US 7,724,252 B2
(45) Date of Patent: May 25, 2010

(54) METHOD FOR THE EDITING OF THREE-DIMENSIONAL GRAPHIC MODELS

(76) Inventor: Gaetano Mazzanti, Via Battisti, 155-61100 Pesaro (IT)

( * ) Notice: Subject to any disclaimer, the term of this patent is extended or adjusted under 35 U.S.C. 154(b) by 735 days.

(21) Appl. No.: 11/503,821

(22) Filed: Aug. 14, 2006

(65) Prior Publication Data

US 2008/0036761 A1 Feb. 14, 2008

(51) Int. Cl.
*G06T 15/00* (2006.01)
(52) U.S. Cl. .................................. 345/419; 345/619
(58) Field of Classification Search ............... None
See application file for complete search history.

(56) References Cited

U.S. PATENT DOCUMENTS

| | | | |
|---|---|---|---|
| 5,297,241 A | 3/1994 | Hirr, Jr. et al. | |
| 5,561,748 A | 10/1996 | Niu et al. | |
| 5,821,941 A | 10/1998 | Millstein | |
| 6,611,725 B1 | 8/2003 | Harrison et al. | |
| 6,614,458 B1 | 9/2003 | Lambert et al. | |
| 6,628,279 B1 | 9/2003 | Schell et al. | |
| 6,654,027 B1 * | 11/2003 | Hernandez | 345/619 |
| 6,781,597 B1 | 8/2004 | Vrobel et al. | |
| 2001/0043236 A1 * | 11/2001 | Yamamoto | 345/781 |
| 2003/0071810 A1 | 4/2003 | Shoov et al. | |
| 2004/0153824 A1 * | 8/2004 | Devarajan et al. | 714/38 |
| 2007/0171223 A1 * | 7/2007 | McArdle et al. | 345/420 |

* cited by examiner

*Primary Examiner*—Kee M Tung
*Assistant Examiner*—David H Chu
(74) *Attorney, Agent, or Firm*—Pearne & Gordon LLP (57) ABSTRACT

Method called "2*d*-like" for the editing of three-dimensional graphic models, including: preparing a three-dimensional graphic model, including a plurality of structural elements, each associated with one or more of the other structural elements according to a data structure, said data structure including sufficient data for a complete description of said three-dimensional graphic model; generating one or more additional items of data, said additional data representing geometrical and/or positional links between said structural elements; receiving at least one modifying signal, representing a modification to be made to at least one predetermined structural element; modifying, in accordance with said modifying signal, the predetermined structural element and the structural elements associated therewith according to said data structure and said additional data, obtaining a corresponding modified three-dimensional model.

22 Claims, 12 Drawing Sheets

METHOD FOR THE EDITING OF THREE-DIMENSIONAL GRAPHIC MODELS

The present invention refers to a method for the editing of three-dimensional graphic models called "2d-like".

As is known, numerous computer programs allow the user to create, store and modify three-dimensional models and their graphic representations on screens or monitors, and to print or provide as output such models and representations of same.

Some software programs are capable to carry out only two-dimensional representation and processing; alternatively, two or more two-dimensional projections (views) of the three-dimensional object may be provided.

More complex 3D programs allow all three dimensions of the object to be represented, thus allowing a complete and accurate description of it; typically, such programs likewise allow the user to obtain two-dimensional views of the 3D model.

Some software programs are provided with functions for generating 3D models starting from two-dimensional views thereof; this however is typically a "one-shot" process: once the 3D model is generated, any link with the 2D views which originated it is lost, and from that point onwards the 3D model is modified with standard techniques.

3D digital models are built using various techniques, the best-known of which is the so-called "parametric feature-based". The user constructs the model by combining, and putting into relation with each other, pre-packaged operations called "features", such as holes, chamfers, pockets, roundings, extrusions etc. Each feature is defined by its position, by any generating geometry, by reference to elements already existing in the model at the time of its creation, and by a series of dimensional parameters (e.g. diameter and depth in the case of a hole) which can be subsequently modified.

Functional as it is, this technique has various disadvantages, and forces the user to become acquainted with unfamiliar concepts such as, for example, geometrical constraints, variational profiles, the dependence of results on the sequence in which features are entered, problems relating to their reordering, etc.

This means that, in order to be able to edit and modify 3D models appropriately with conventional software programs, the user must have a specific and complete knowledge of the complex functionalities mentioned above. This problem is experienced particularly by users of 2D CAD systems, to whom these problems are generally completely alien and unintelligible.

The editing of digital models is effected by interacting with the features, in other words by modifying the parameters which define them and the geometrical references used in their construction, or by manipulating them graphically using suitable tools.

However, the possibilities of modification are limited, and once the features of a model are created, the processing can be carried out only by modifying the defining parameters and/or the relations between them and/or possibly the sequence in which the features themselves are ordered.

In particular, the features can only be altered by operating on the so-called "driving dimensions", a subset of all the elements which define each feature, without allowing the user the possibility of introducing and then modifying other dimensions on which to act directly. Any additional dimensions introduced are considered "driven", and their value is recalculated automatically each time the model is altered, but this value cannot be modified explicitly by the user.

Furthermore, the relations and the constraints which define these features, which are determined at the moment they are generated, may be hidden from the user, and it thus becomes complicated or actually impossible to make substantial modifications to these constraints and relationships.

This is clearly far from being an ideal situation, and does not result in a product which provides a general and intuitive way of processing 3D digital models.

An object of the present invention is to provide a method for the editing of three-dimensional graphic models which allows the user to simply and intuitively modify an existing model.

Another object of the invention is to provide a method for processing which allows editing of a 3D model by acting on two-dimensional views of said model. These views can be of the most diverse types.

A further object of the invention is to make available a processing method which allows the user to modify a three-dimensional model according to the needs of the user, with extreme freedom, and particularly in a manner independent of the modality with which the model was originally created.

These and yet other objects are substantially achieved by the method for editing three-dimensional graphic models according to the descriptions given in the attached claims.

Further characteristics and advantages will appear more clearly from the detailed description of a preferred, but not limiting, embodiment of said method; this description is provided with reference to the attached figures, in which.

The method according to the invention includes first of all a stage of preparing a three-dimensional graphic model, representing for example an object or group of objects.

In general, the three-dimensional graphic model can be created using software tools of known type such as, for example, Catia, Pro-Engineer, Solidworks, Inventor, etc.

The three-dimensional graphic model is defined by a plurality of structural elements; these can be simple geometrical elements such as, for example, faces, edges or vertices, or features (for example holes, chamfers, roundings, pockets etc.), features dimensions, mutual distances between features, geometrical references used in their definition, relations and constraints between components of an assembly etc.

In other words, the term "structural elements" is intended to include all the data necessary for the definition of the model in terms of shape and dimensions.

In the present context, the term "assembly" is intended to indicate a hierarchical, possibly multi-level, aggregation of three-dimensional models, which can also be related to each other through positional and/or geometrical parameters; the models which form an assembly are also called "components" of this assembly.

The model may be of solely geometrical type, i.e. defined in terms of individual geometrical elements such as, for example, faces, edges, vertices, curves, lines, dimensions etc.

Alternatively, the model may be of "feature-based" type, i.e. defined not only in terms of individual geometrical elements, but also by means of features.

The three-dimensional model to which the method according to the invention is applied may also be constituted by or include an assembly of components.

In any event, the three-dimensional model is associated with a data structure in which all the data necessary and sufficient for a complete description of the model itself are included.

For example, the data structure may include the position and slope of a line, the orientation of a surface, the parameters of a feature etc.

In practice the data structure associated with the three-dimensional model includes the minimum set of data sufficient for a complete description (and therefore a complete representation) of the model itself.

In the case of a feature-based model, the data structure includes all the data necessary for the definition of the features included in the model itself and for their modification and re-generation.

Preferably, the method according to the invention also includes a stage of obtaining one or more two-dimensional views of the above-mentioned three-dimensional model.

These views may be provided in one or more 2d layouts directly by the application through which the three-dimensional model was created.

Additionally, or alternatively, the method according to the invention provides for the creation of one or more layouts from scratch, in which the various two-dimensional views are represented.

These two-dimensional views may be, for example, three orthogonal projections of the model which represent front, side and top views of the model itself, or any other projection created using arbitrarily oriented planes.

It is also possible to configure auxiliary, detailed, projected views etc.

It should be noted that the views can contain both visible elements and hidden lines.

It is likewise possible to obtain one or more views taken on cross-section planes at arbitrary angles, preferably defined by the user; the angle of these cross-section planes can therefore be not parallel and not perpendicular to the planes on which the three main orthogonal projections are taken.

Such sectional views are particularly advantageous in cases where it is desired to access structural elements which are not easily visible or identifiable in the standard orthogonal projections, in particular in the case of assemblies.

Preferably, links are defined which connect corresponding elements in different views—in other words which connect together the various views of the same element (for example an edge in the front and side views); links are likewise defined between individual structural elements represented in the two-dimensional views and the corresponding structural elements in the three-dimensional model.

Figure 1:
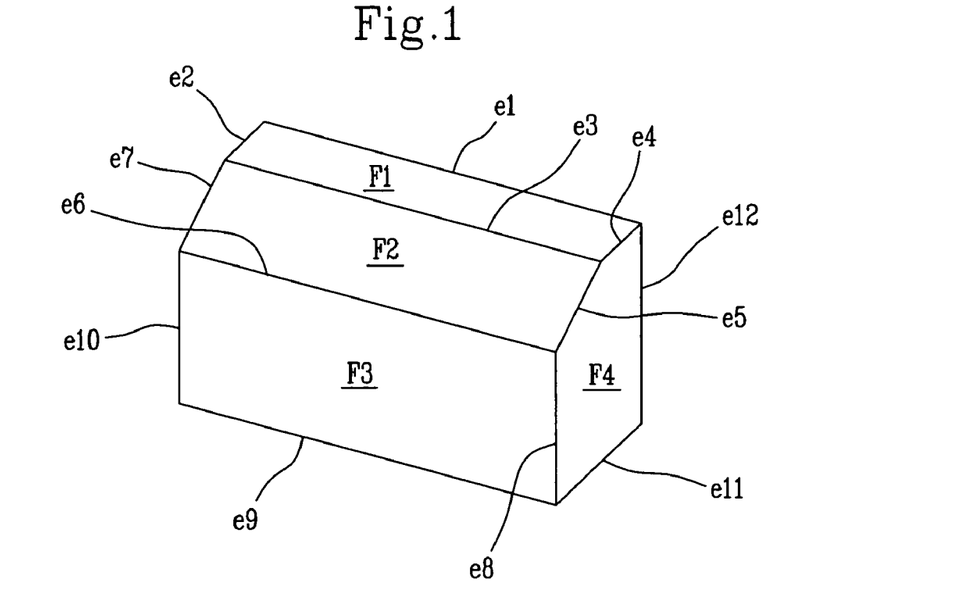
FIG. 1 shows a perspective view of a three-dimensional graphic model containing two features (extrusion and chamfer)
Figure 2A:
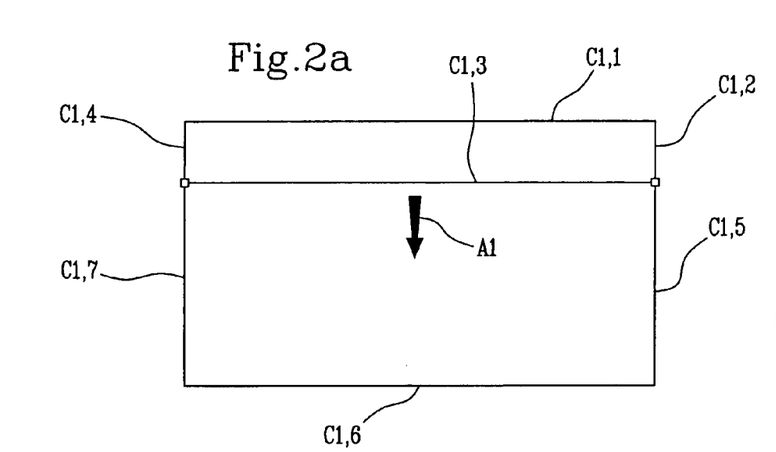
FIGS. 2*a*-2*c* show a front view, a side view and a top view of the model in FIG. 1.
Figure 2B:
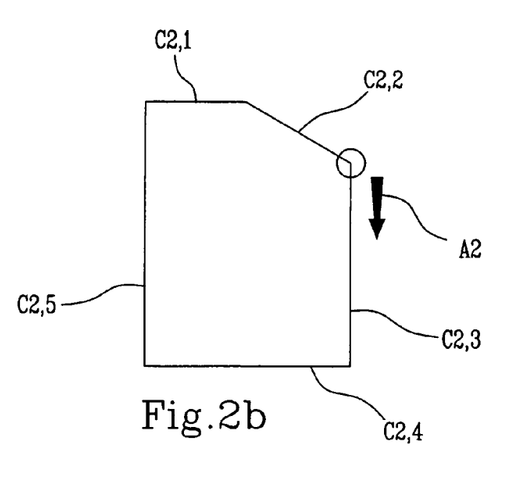
Figure 2C:
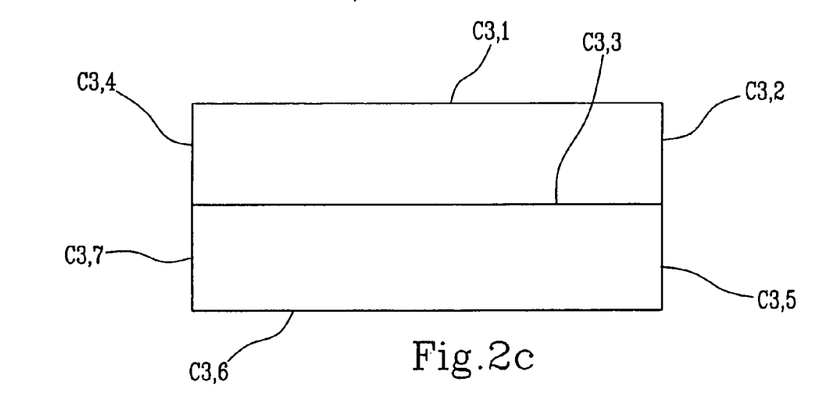

By way of example, with reference to FIGS. 1 and 2a-2c, the edge e6 of the three-dimensional model M will be put into relation with segment c1,3 in FIG. 2a, with segment c3,6 in FIG. 2c, and with the intersection-point of segments c2,2 and c2,3 in FIG. 2b.

Note that, in the case of feature-based models, the description is not unambiguous: in fact, the model in FIG. 1 could be obtained by extruding, in direction e1, a profile with 5 curves (e4, e5, e8, e11, e12), or by extruding a rectangular profile (curves de104, de108, e11, e12 in FIG. 1a) and then applying a chamfer feature to edge de103, etc.

FIGS. 5, 6, 7 and 8 show a set of diagrams representing the relationships established between the various elements which make up the three-dimensional model M in FIG. 1.

Figure 5:
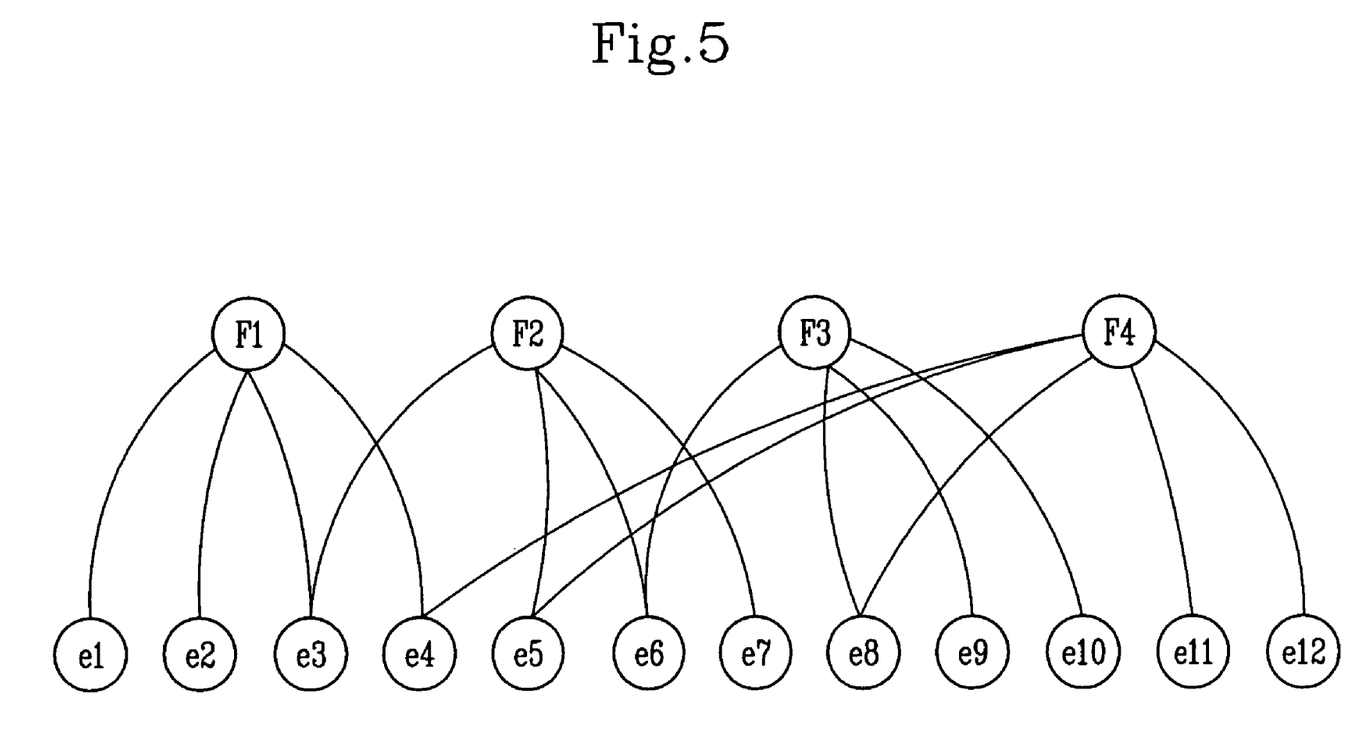
FIG. 5 shows the topological relations between edges and faces of the model in FIG. 1.

In particular, FIG. 5 shows the relationships which hold between each edge e1-e12 in FIG. 1 and the faces F1-F4 which are defined by these edges; in practice each face is associated with the edges which form its boundary.

Figure 1A:
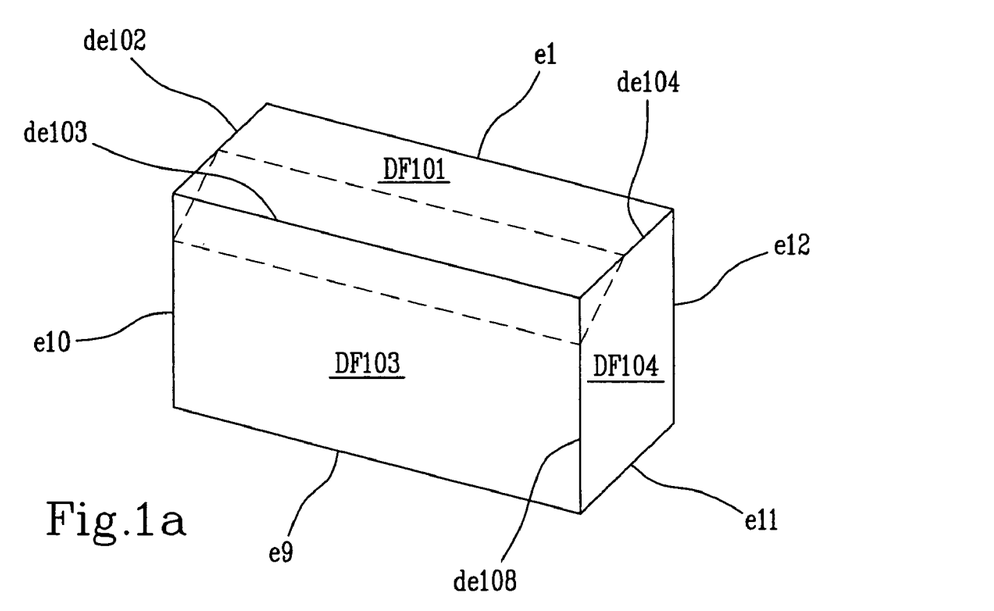
FIG. 1*a* shows the model in FIG. 1 in the phase preceding the creation of the chamfer, this last being represented by dotted lines.
Figure 6:
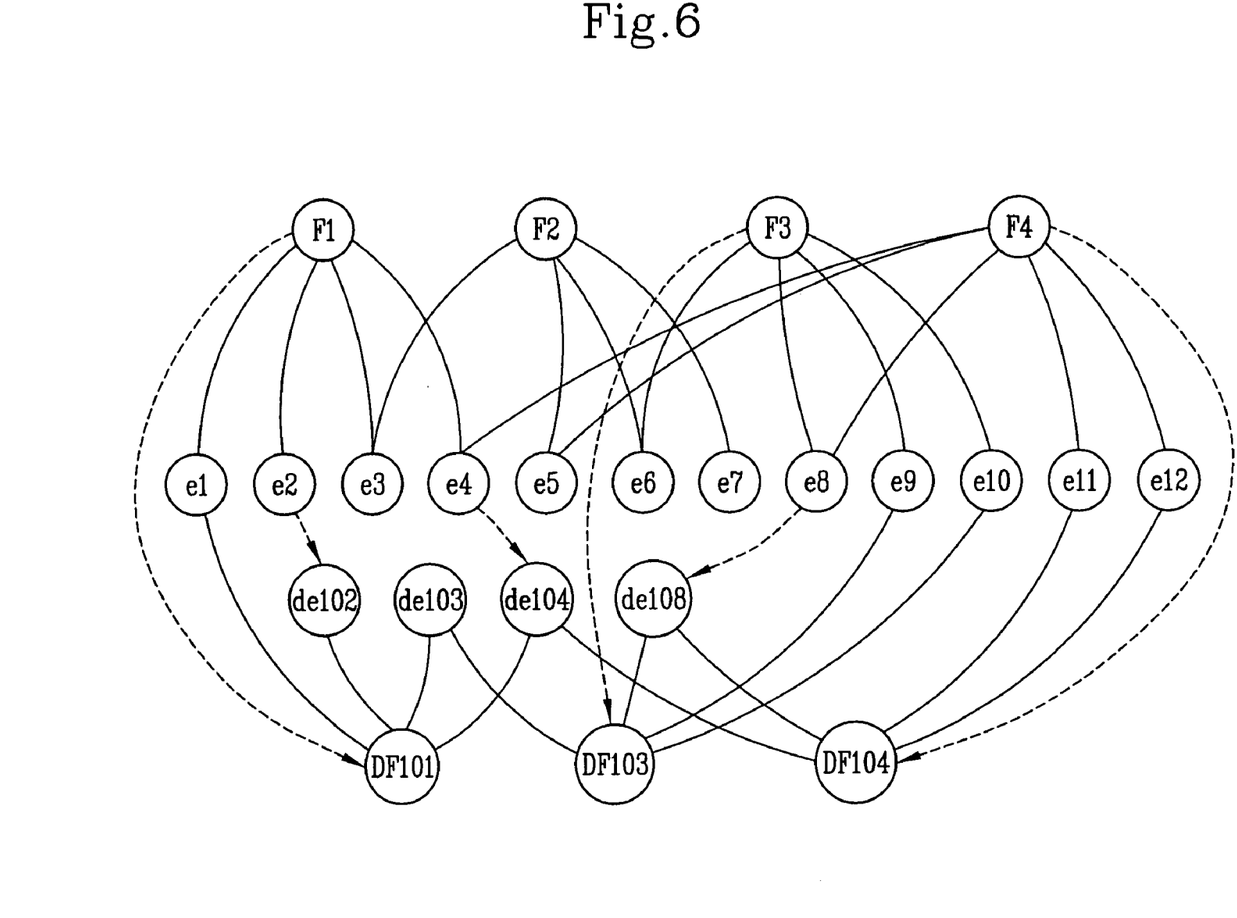
FIG. 6 shows the relations between edges and faces of the model in FIG. 1*a*.

FIG. 6 shows the correspondences between the elements of FIG. 1 and the elements of FIG. 1a: each face F1-F4 in FIG. 1 is associated with the respective face DF101, DF103, DF104 in FIG. 1a (with the exception of face F2, which has no corresponding face in FIG. 1a because it does not yet exist); each face in FIG. 1a is associated with edges e1-e12, de102, de103, de104, de108 which define its boundary; edges de102, de103, de104, de108 in FIG. 1a are also associated with the corresponding edges e1-e12 in FIG. 1.

It should be noted that to show relations between edges in FIG. 6, a dotted line has been used for the "derived" edges (i.e. those which, for example, have been shortened following the introduction of the chamfer).

Figure 7:
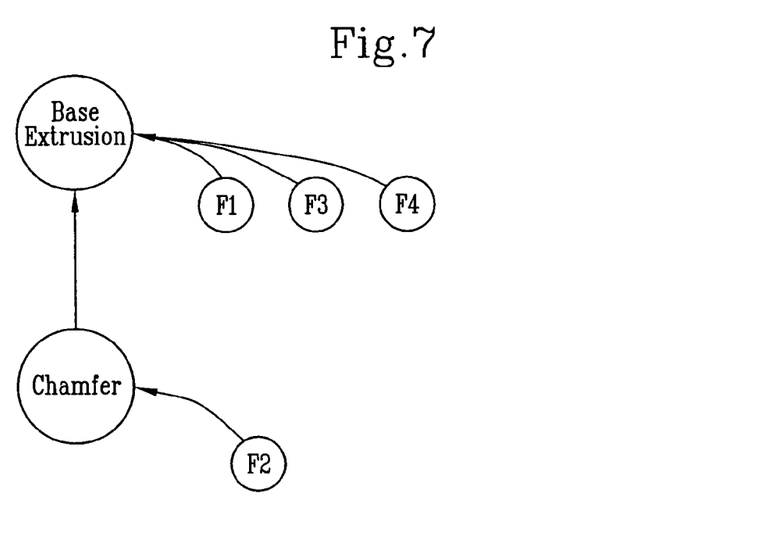
FIG. 7 shows the links between the faces of the model in FIG. 1 and the two features contained in it.

FIG. 7 shows the relationships between the extrusion and chamfer features, and their respective faces: the extrusion feature has led to the generation of faces F1, F3 and F4, while the chamfer feature has led to the generation of face F2.

Figure 8:
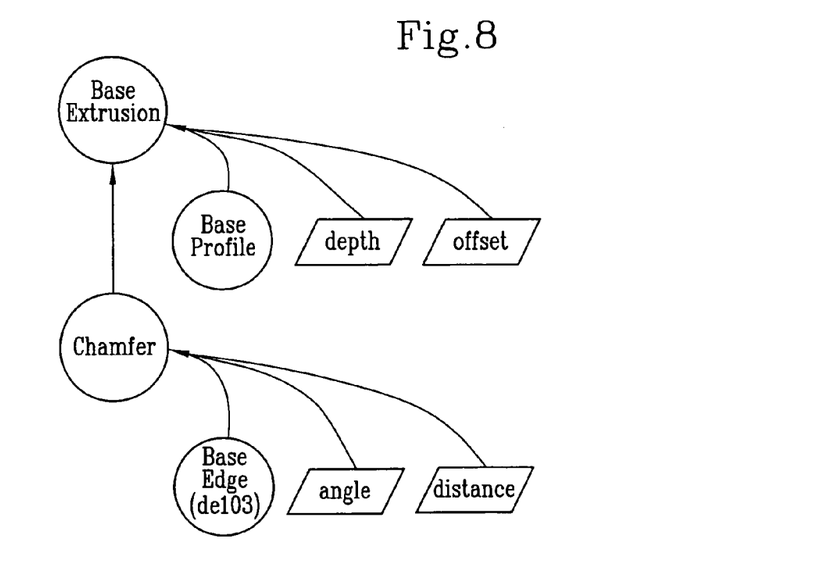
FIG. 8 shows the parameters relative to the two features and their references to the existing geometry.

FIG. 8 on the other hand shows an example of data essential for enabling the two features mentioned above (extrusion and chamfer) to be created: the base profile, the depth and the offset with respect to the starting plane have been identified for the extrusion; while for the chamfer, the edge to be chamfered, along with the angle of inclination and the distance from the chamfered edge have been identified.

Figure 9:
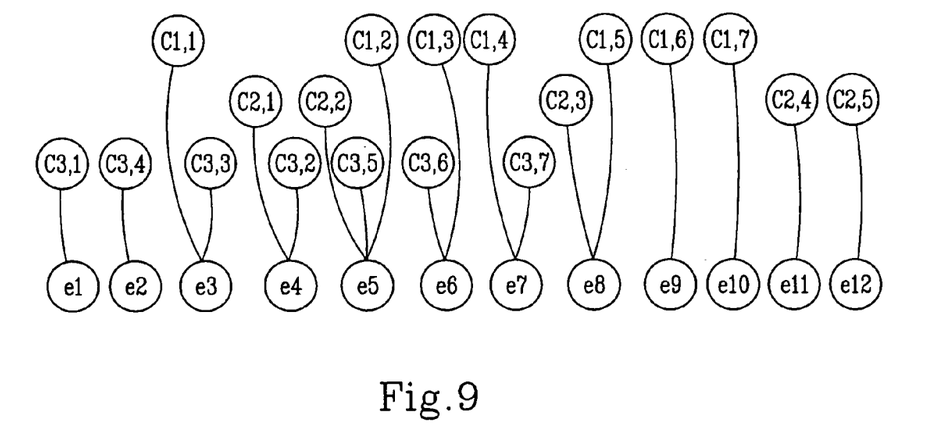
FIG. 9 shows the links between the curves shown in FIGS. 2*a*-2*c* and the edges of the model in FIG. 1.

FIG. 9 shows the links between the curves shown in the two-dimensional projections in FIGS. 2a-2c, and the edges of the three-dimensional model in FIG. 1.

The method according to the invention further includes a stage of generating one or more items of additional data, representing geometrical and/or positional and/or semantic relations between the various structural elements of the three-dimensional model and their 2d views counterparts.

Such additional data may be, for example, associations between points having the same abscissa or the same ordinate, associations between straight lines parallel or perpendicular to each other, or curves belonging to the same feature etc.

The additional data can include information of a semantic type, i.e. relative to a hierarchy or "belonging to" relationships between parts of the model; for example the information of semantic type can concern the fact that a certain element/component belongs (or does not belong) to a feature or an assembly.

Figure 10:
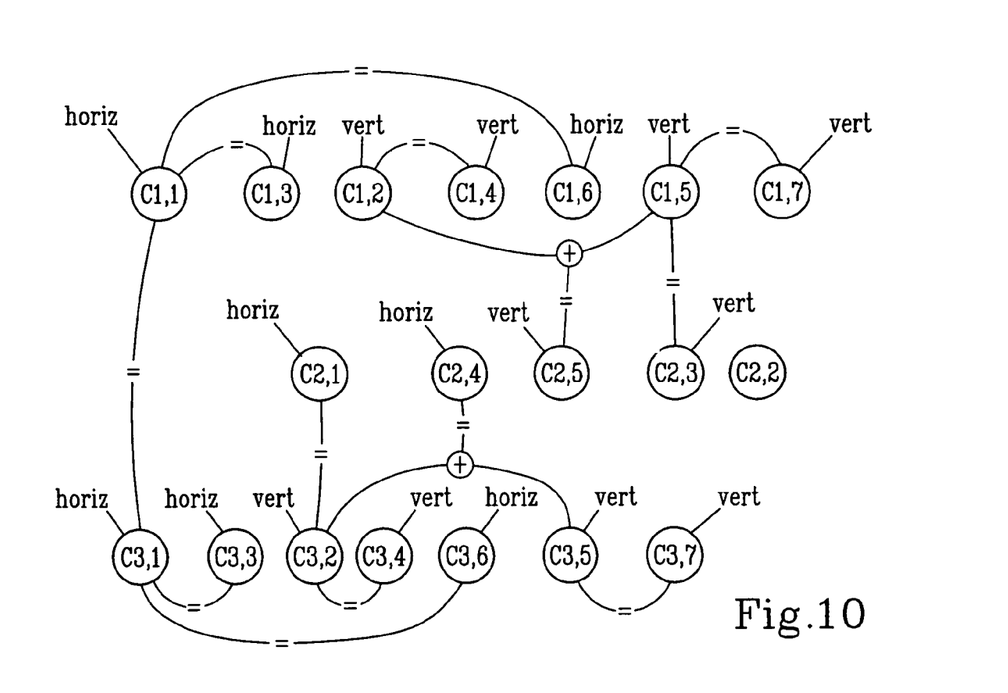
FIGS. 10, 11 and 12 show examples of additional data generated by the method according to the present invention.
Figure 11:
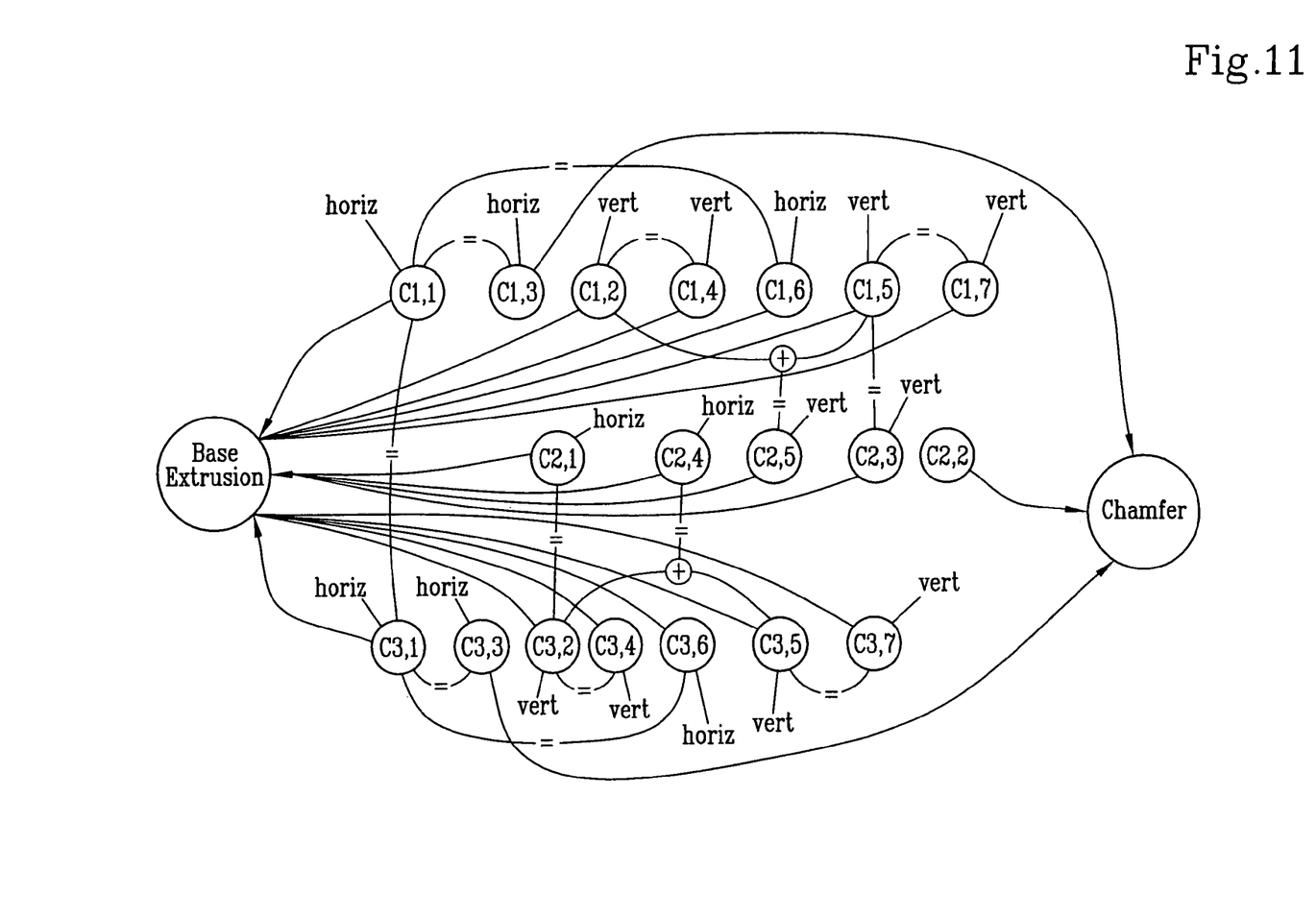
Figure 12:
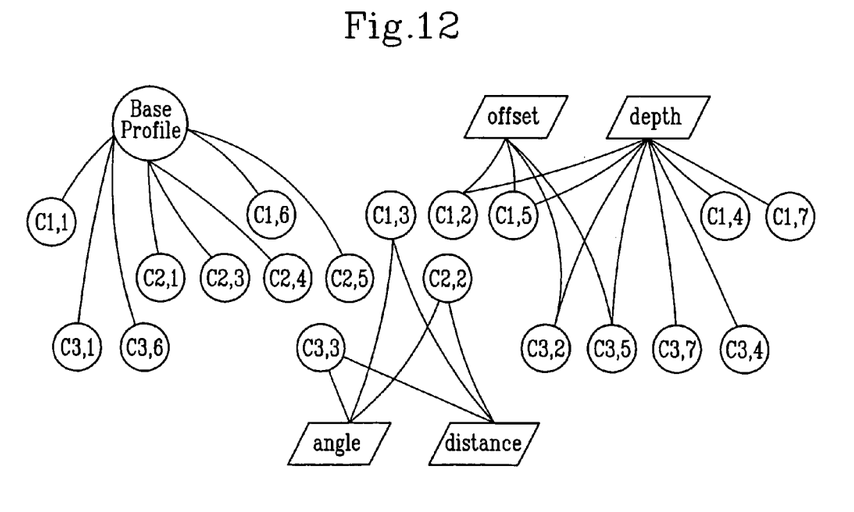
Figure 13A:
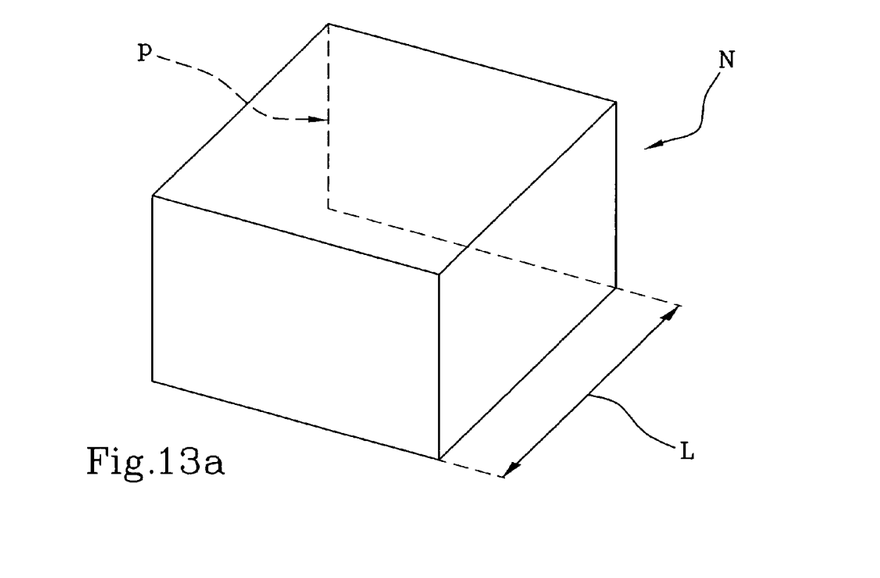
FIGS. 13*a* and 13*b* show a further three-dimensional model to which a modification is made.
Figure 13B:
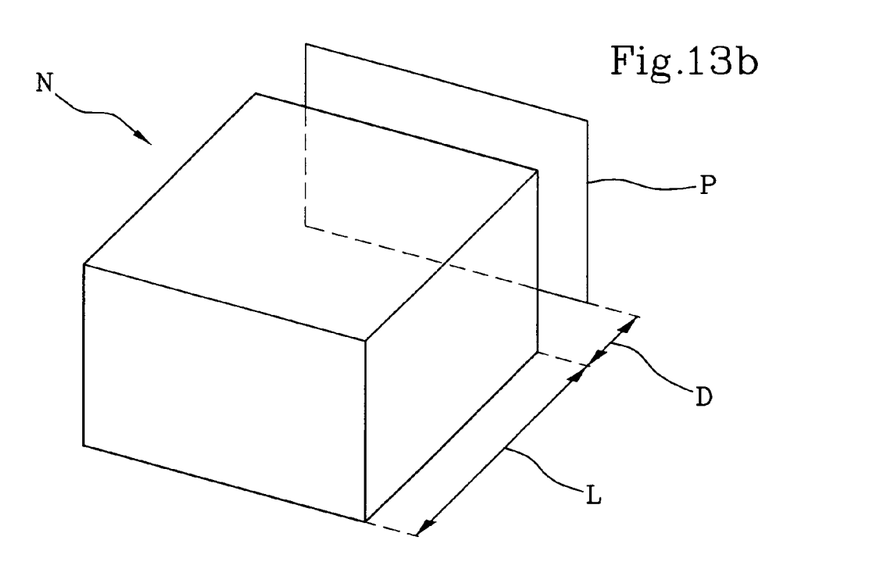

FIGS. 10, 11 and 12 show how, with respect to the preceding diagrams, a series of relations of geometric/positional type between various elements of the model have been added.

It may be noticed for instance how the segments in the two-dimensional views are associated with attributes relating to orientation (horizontal or vertical) of the corresponding 3*d* edges, and relationships have been added relating to the equality between the lengths of some of these edges.

Provision is also made for entering relationships of a more complex type, such as for example the relationship defined between segments c1,2 c1,5 and c2,5, according to which the sum of the first two provides the length of the third; a similar relationship has been defined between segments c3,2, c3,5 and c2,4.

Figure 3A:
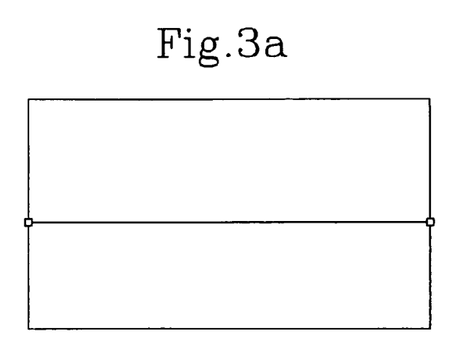
FIGS. 3*a*-3*c* show a front view, a side view and a top view of a modification made to the model in FIG. 1.
Figure 3B:
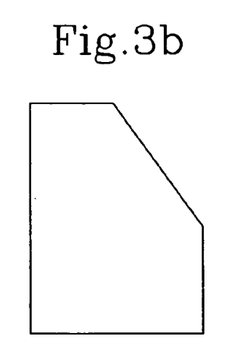
Figure 3C:
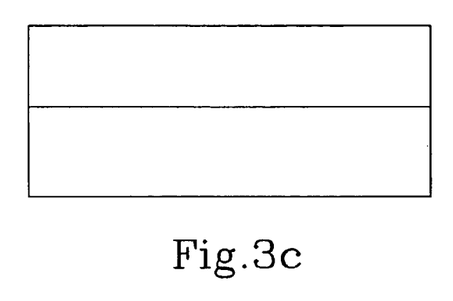

FIG. 12 shows relationships between the various segments shown in the two-dimensional views and the extrusion and chamfer features, and with the parameters which define such features (the depth and the offset as regards the extrusion, the angle and the distance as regards the chamfer). In particular, in carrying out the modification illustrated in FIGS. 2*a*-2*c* and 3*a*-3*c*, the system is capable of identifying that the selected element corresponds respectively to the end point of curves c2,2 and c2,3 (FIG. 2*b*) and to the curve c1,3 (FIG. 2*a*). Following the displacement downwards, the relationships represented in FIGS. 10 and 11 allow the two-dimensional views as shown in FIG. 3 to be updated (exploiting the relationship c1,5=c2,3), while data in FIGS. 11 and 12 allow updating of the three-dimensional model, in particular modifying the characteristics of the chamfer feature (angle and/or distance). On examination of FIG. 11 it will be noticed, in fact, that curve c1,3 is linked to the chamfer feature, and in particular (FIG. 12) to the angle and distance parameters.

With reference to FIGS. 15, 15*a*-15*c*, 16, 16*a*-16*c*, a brief description is given here below of an example of an alteration made to a three-dimensional model, by operating on a driven dimension, activating the method according to the invention.

Figure 15:
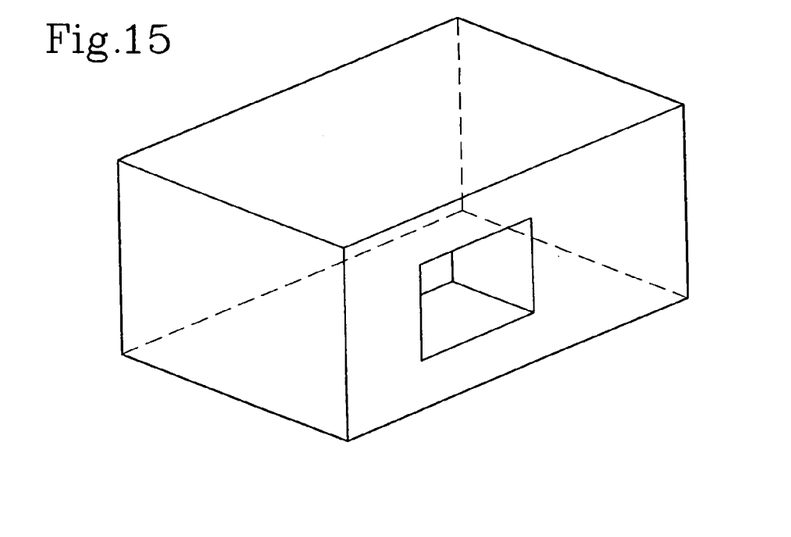
FIGS. 15, 15*a*-15*c*, 16*a*-16*c* and 17 show another three-dimensional model to which a modification is made by operating on a "driven" dimension.

FIG. 15 shows a three-dimensional model, made up of a parallelepiped starting block (obtained by extrusion) and a slot, this too having a rectangular shape and being formed by extrusion.

Figure 15A:
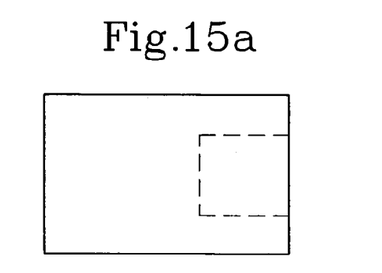
Figure 15B:
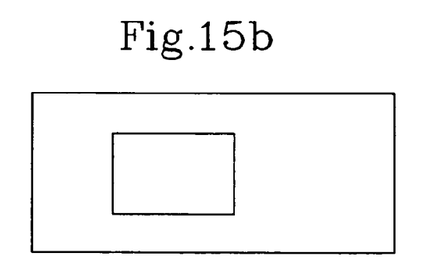
Figure 15C:
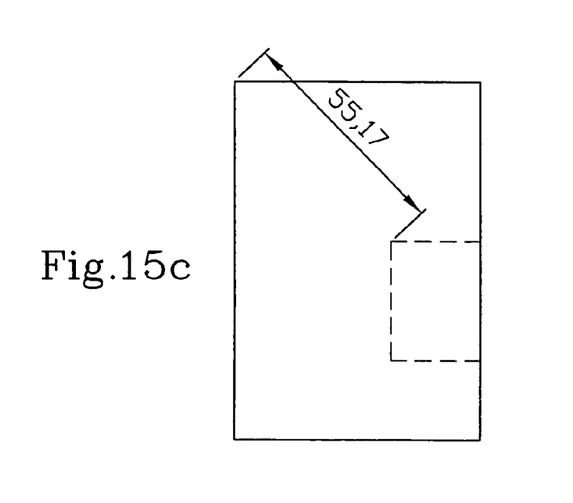

FIGS. 15*a*, 15*b*, and 15*c* show respectively the corresponding side, front and top views of the model in FIG. 15.

A dimension is introduced—non-driving, i.e. driven—relating to the distance between a vertex of the slot and a vertex of the paralleliped starting block; for example let this distance measure 55.17 mm.

Figure 16A:
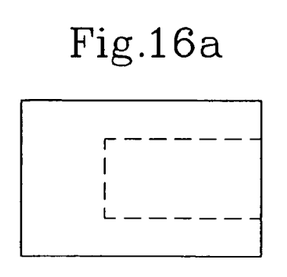
Figure 16B:
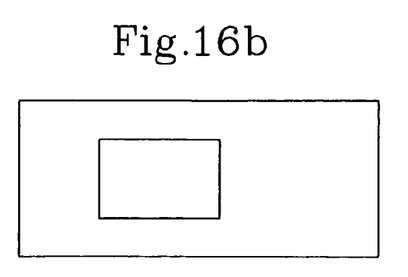
Figure 16C:
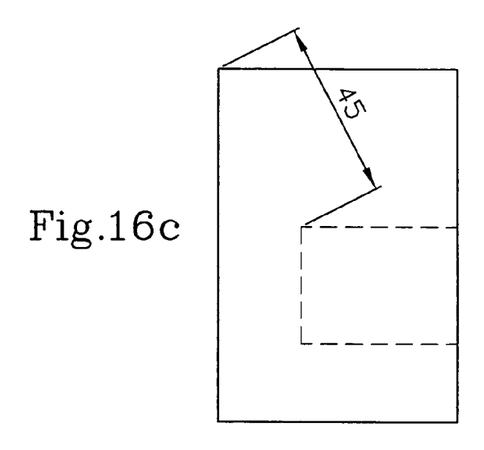

If this value is edited and modified, for example making the distance indicated have a length equal to 45 mm, modified two-dimensional views will be obtained, like those shown in FIGS. 16*a*-16*c*.

Figure 17:
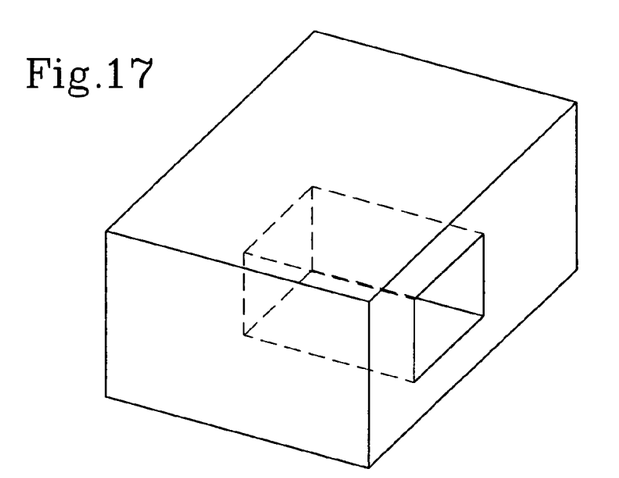

The corresponding rebuilt three-dimensional model is shown in FIG. 17; it must be emphasised that the depth of the slot (typically a driving dimension of the feature) has been modified by acting exclusively on a driven dimension, an operation not permitted by the software of known type.

The additional data, combined with the initial data structure, constitute in practice a redundant data system, in which the totality of the information collected is larger than the minimum set of data necessary for the description and representation of the three-dimensional model.

In this way it is possible to make modifications to the three-dimensional model in a particularly rapid and flexible manner, since the number of values/relationships on which it is possible to operate for entering such modifications is significantly increased.

It should be noted that thanks to the introduction of the additional data, it becomes possible to enter modifications by acting not only on the "driving dimensions"—i.e. the "principal dimensions" of a feature, used in constituting it and defining a subset of all the dimensions of this feature, but also by acting directly on the "driven dimensions", which in the systems of known type cannot be directly edited or modified.

It should be noted that dimensions can be not only relative to a single feature, but may also refer to relationships between two or more features or to relationships between components of an assembly.

Furthermore, even in the case of non feature-based models, it is possible arbitrarily to introduce driven dimensions, which may be freely modified by the user.

Preferably, in the event that one or more two-dimensional views are available, the data structure and/or the additional data include data representing the correspondence between the elements in the three-dimensional model and the elements represented in the two-dimensional views(s), in order to make it possible to transfer to the three-dimensional model any modifications made to the two-dimensional views.

In order to allow the user to edit and modify the model originally created, the method according to the invention provides a stage of receiving at least one modifying signal representing a modification to be made to at least one predetermined structural element.

This modification may be made directly on the three-dimensional model as represented on the user's screen, or may be made on one or more of the two-dimensional views, in the event that these have been made available; the latter modification may be made in the context of the original layout or in a replica of it, expressly dedicated to modifications.

As mentioned above, the term "structural elements" includes both simple geometrical elements such as, for example, faces, edges or vertices, and features (for example holes, chamfers, roundings, pockets etc.), dimensions of the features, mutual distances between features, geometrical references used in their definition, constraints and relationships between components of an assembly, etc.

The term "structural elements" can likewise include assemblies or groups of geometrical elements or features, or parts of such assemblies.

The modifying signal may therefore be relative for example to alteration of the inclination of an edge of a solid figure.

The modifying signal may also be relative for example to the alteration of a dimension corresponding to an element of the model, or to one of its features, or to a part in the context of an assembly.

The modifying signal may also be relative to an alteration of a relationship between components of an assembly.

As mentioned above, the modifying signal may refer either to driving dimensions, or to driven dimensions, in virtue of the additional data which has been associated with the structure of the three-dimensional model.

The modifying signal may likewise concern the distance or another relationship between two features or parts or components; in this case, the user will be given the possibility of choosing which of the features/parts/components to modify with respect to the others.

With reference to transform operations, the modifying signal may represent for example a translation or a rotation.

The modifying signal is suitably generated by the user, according to predetermined modalities.

For example, the user will be able to select the structural element to be modified, and to enter a numerical value relating to this alteration (typically in the case of alterations to dimensions or distances).

Another modality provided, to be used preferably for the modification of positioning and distances, consists in the possibility of dragging one or more elements, features or suitably selected portions of them, from their current position to their desired destination position.

In the event that ambiguities arise with reference to the modifying signal which has been entered, the system provides the user with the possibility of choosing between the available options: for example, following the entry of a numerical value representing a distance which must be altered, the user may be asked to specify which of the elements must remain in its current position and which must be moved, so that the distance between them can be equal to the new value which has just been entered.

From the point of view of the graphic presentation of the options, a "drop-down" menu may be used, which appears automatically in the event that an ambiguity occurs; the user then has the possibility of selecting one of the options which appear in this menu.

Advantageously, the modifying signal can be entered with reference to at least one of the two-dimensional views of the 3D model; as mentioned above, the two-dimensional views on which to operate can be made available directly from the application through which the 3D model was generated, or they can be generated from scratch from the layouts in which these two-dimensional views are represented.

The two-dimensional view, if any, used for entering the modifying signal can be of any type (either a conventional orthogonal projection, or an auxiliary or detailed view, or a sectional view in any orientation).

The modifying signal concerns at least one predetermined structural element, which is suitably selected by the user.

For example, in the case in which the predetermined structural element is a geometrical element, following the reception of the modifying signal this element may be translated, stretched, rotated etc.

It should be noted that the selection of the structural element or elements to be modified can be concretely effected by identifying a parameter—for example, a dimension—relative to such element(s) on which the modifying signal will act.

In FIGS. 2a and 2b, a modification is indicated (arrows A1, A2) which consists of the displacement in a vertical direction of edge e6 (represented, as mentioned above, by segment c1,3 in FIG. 2a and by the point of contact between segments c2,2 and c2,3 in FIG. 2b).

Figure 4:
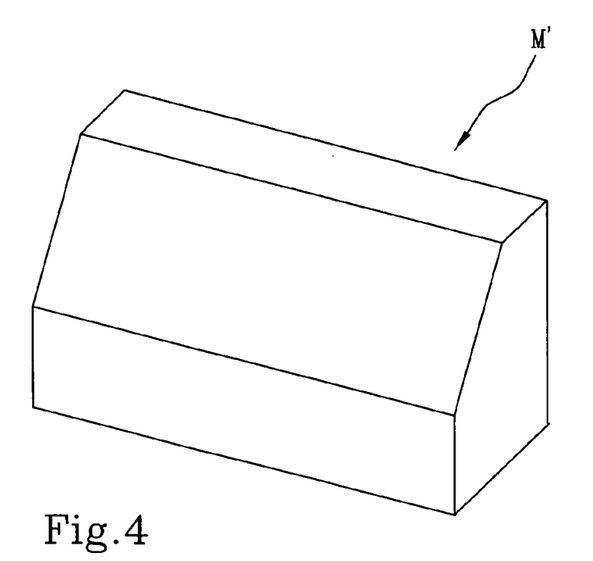
FIG. 4 shows a perspective view of the modification to the model in FIG. 1 shown in FIGS. 3*a*-3*c*.

The result of this displacement is illustrated in FIGS. 3a-3c in terms of two-dimensional projections, while FIG. 4 shows the three-dimensional model M' obtained following the above-mentioned modification. Note that if the model is feature-based and contains for example a "chamfer" feature, the modification entails the implied redefinition of this feature.

By way purely of example, we may also consider a three-dimensional model N (FIGS. 13a-13b, 14a-14c), created using a feature of extrusion type, defined by an initial planar profile P and by a length of extrusion L (the result of this extrusion is an upright prism having as base the initial planar profile P).

Figure 14A:
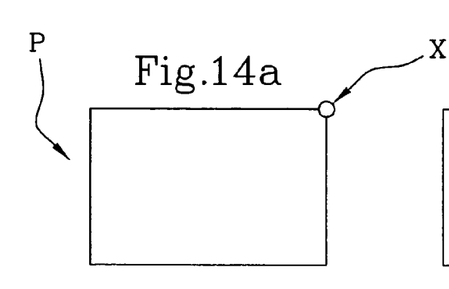
FIGS. 14*a*-14*c* show a front view, a side view and a top view of the model in FIG. 13*b*.
Figure 14B:
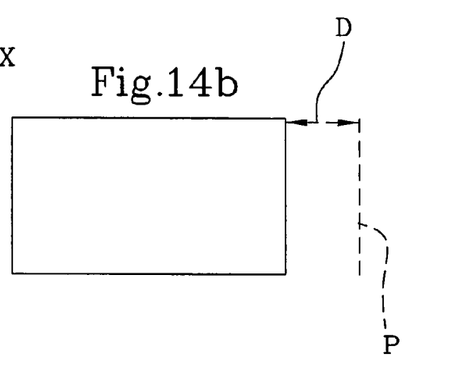
Figure 14C:
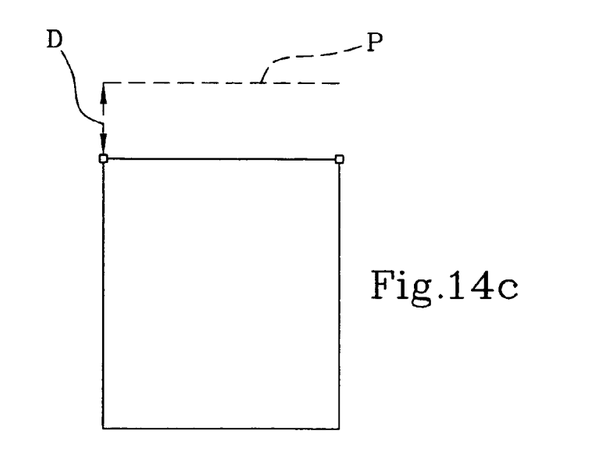

If the above-mentioned two-dimensional views are made available to the user, a first modification can be made by operating on a front view 14a, by displacement of a vertex or of a line belonging to initial profile P; a second modification may be made by operating on a side view 14b or a top view 14c, in which it is possible to increase or decrease the distance between the two lines (vertical in the first case, horizontal in the second) corresponding to the bases of the extruded solid, in fact by modifying the depth, and/or introducing an offset D between the plane on which the initial profile P lies, and the start of the extrusion itself; a third modification, still relating to views 14b or 14c, consists of increasing or reducing the distance between the two lines (horizontal in the first case, vertical in the second) which define the height and the width of the extruded solid: this operation in fact modifies the original profile from which the solid was generated.

Note that the last two modifications can be achieved by a single operation, by altering for example the position of point X, shown in FIG. 14a, in an arbitrary direction.

It must be emphasised that though the operations mentioned have very diverse effects on the features that define the model and on their parameters/characteristics, they are carried out by the user by acting with a single modality, unlike what occurs in current systems.

Following reception of the modifying signal, there is a stage of identifying which structural element or elements are to undergo modifications in virtue of the data which has been entered by the user.

In particular, it should be noted that typically the structural element on which the operator acts when introducing the modifying signal is not the only one to undergo alteration.

For example, returning to the case in which the initial profile of an extrusion is modified, consider the instance of a polygonal initial profile: if the inclination of one side is modified, there must necessarily also be alteration in the length of at least one of the adjacent sides, just as the shape of the surface generated by the operation of extrusion must also change.

In general, therefore, the selection of which structural elements must be modified as a result of the modifying signal depends on the initial data structure and/or the structure of the above-mentioned additional data. In the case of a feature-based model, the features involved in the operation are identified and their data and relationships modified in consequence. In the example shown in FIG. 1, the modification relates for example to the chamfer feature, whose "distance from the chamfered edge" and/or "angle" parameters are modified.

The alterations caused to each structural element selected are likewise calculated, still depending on the initial data structure and/or the structure of the additional data.

Generally, the selection is made among the structural elements of the three-dimensional model.

Preferably, in the event that the two-dimensional views are available, the selection and calculation of the modifications are made with reference to these two-dimensional views.

It should be noted that, thanks to the introduction of the additional data in combination with the initial data structure, it is possible to give the user the possibility of substantially modifying any part of the model, independently of the manner in which the model itself was generated.

In fact, while feature based modelers only allow editing of "driving dimensions", whereas "driven dimensions" are not editable (as mentioned above), by applying the method according to the invention it is possible to directly edit any dimension, including those which in a standard model would be "driven dimensions". A similar result can be achieved directly manipulating (i.e. dragging) entities as shown in FIG. 14.

Consequently, it is possible to address driven dimensions directly with one or more modifying signals, and achieve corresponding alterations in the specified feature(s) and in the structural elements linked to them according to the initial data structure and/or the additional data subsequently generated.

Finally, there is a stage of re-generation or modification of the three-dimensional model, after which the result of the modifications entered is made visible to the user.

In the event that the two-dimensional views are available, the alterations can first be calculated on these views, and made visible to the user.

Subsequently, the updated three-dimensional model can be displayed.

It should be noted that the user can be given the possibility of entering several modifying signals; in this event, it is possible for the modifications to be made visible first on the 2d layouts in which the two-dimensional views are represented, while the three-dimensional model is later updated/re-generated once only, so that the overall result of what the operator has been doing is made completely visible.

The invention claimed is:

1. Computer-implemented method for the editing of three-dimensional graphic models, including:
   preparing a three-dimensional feature-based graphic model using a computer, said three-dimensional feature-based graphic model including a plurality of structural elements, each associated with one or more of the other structural elements according to a data structure, said data structure including sufficient data for a complete description of said three-dimensional model, said data structure including geometry and topology information, features parameters, constraints and relationships;
   generating a first set of additional data, said first set of additional data representing supplementary geometrical and/or positional and/or semantic data and relationships between said structural elements, said additional data not representing features and related parameters, constraints and relationships available in conventional feature-based models;
   receiving at least one modifying signal, representing a modification to be made on at least one predetermined structural element exploiting said first set of additional data;
   modifying, in accordance with said modifying signal, the predetermined structural element and the structural elements associated therewith according to said data structure and said first set of additional data,
   thereby updating said data structure and said first set of additional data,
   obtaining a corresponding modified three-dimensional graphic model,
   displaying said corresponding modified three-dimensional graphic model on a computer screen connected with said computer.

2. Method according to claim 1, including also a stage of preparing one or more two-dimensional views of said three-dimensional model and a stage of generating a second set of additional data, said second set of additional data representing supplementary, geometrical and/or positional and/or semantic data and relationships between structural elements of the two-dimensional views and between structural elements of the two-dimensional views and the three-dimensional model, said second set of additional data not representing features and related parameters, constraints and relationships available in conventional feature-based models.

3. Method according to claim 2, including also a stage of selecting said predetermined structural element in at least one of said one or more two-dimensional views, and a stage of receiving a second modifying signal representing a modification to be made on said predetermined structural element.

4. Method according to claim 3, including also a stage of modifying one or more of said one or more two-dimensional views, in accordance with said second modifying signal thereby updating said data structure and said second set of additional data.

5. Method according to claim 4, including also a stage of re-generating said three-dimensional model in accordance with said second modifying signal subsequently to said stage of modifying said two-dimensional views thereby updating said first set of additional data.

6. Method according to claim 1, in which said three-dimensional model is a model containing only geometrical and topological data.

7. Method according to claim 1, including also a stage of verifying whether the modification received via said modifying signal is consistent with said data structure and with said additional data.

8. Method according to claim 2, in which said one or more two-dimensional views include two-dimensional views of said model oriented according to arbitrarily oriented planes, and in particular according to three planes perpendicular to each other.

9. Method according to claim 2, in which said one or more two-dimensional views include one or more cross-section views of said three-dimensional model.

10. Method according to claim 9, in which said modifying signal represents a modification of one or more structural elements represented in said cross-section view.

11. Method according to claim 1, in which said stage of receiving at least one modifying signal includes a stage of receiving a plurality of modifying signals.

12. Method according to claim 1, in which said at least one modifying signal represents a translation of said predetermined structural element.

13. Method according to claim 1, in which said at least one modifying signal represents a rotation of said predetermined structural element.

14. Method according to claim 1, in which said at least one modifying signal represents a modification of one or more features of said feature-based model.

15. Method according to claim 14, in which said modifying signal represents a creation or a deletion of a feature of said feature-based model.

16. Method according to claim 1, including also a stage of arbitrarily adding a dimension representing a distance or a dimension between two points or entities of the model.

17. Method according to claim 16, in which said modifying signal represents a modification of said dimension arbitrarily added.

18. Method according to claim 1, in which said model includes an assembly of components.

19. Method according to claim 18, in which said modifying signal represents an alteration of a dimension or a relationship between components of an assembly.

20. Computer system for the editing of three-dimensional graphic models, said computer system being configured to perform the following steps:
   preparing a three-dimensional feature-based graphic model, including a plurality of structural elements, each associated with one or more of the other structural elements according to a data structure, said data structure including sufficient data for a complete description of said three-dimensional model, said data structure including geometry and topology information, features parameters, constraints and relationships;
   generating a first set of additional data, said additional data representing supplementary geometrical and/or positional and/or semantic data and relationships between said structural elements, said additional data not representing features and related parameters, constraints and relationships available in conventional feature-based models;

receiving at least one modifying signal, representing a modification to be made on at least one predetermined structural element exploiting said first set of additional data;

modifying, in accordance with said modifying signal, the predetermined structural element and the structural elements associated therewith according to said data structure and said first set of additional data, thereby updating said data structure and said first set of additional data, obtaining a corresponding modified three-dimensional graphic model.

21. Computer-implemented method for the editing of three-dimensional graphic models, including:

preparing a three-dimensional non-feature-based graphic model using a computer, said three-dimensional non-feature-based graphic model including a plurality of structural elements, each associated with one or more of the other structural elements according to a data structure, said data structure including sufficient data for a complete description of said three-dimensional model, said data structure including geometry and topology information;

generating a first set of additional data, said additional data representing supplementary geometrical and/or positional and/or semantic data and relationships between said structural elements, said additional data not representing features and related parameters, constraints and relationships available in conventional feature-based models;

receiving at least one modifying signal, representing a modification to be made on at least one predetermined structural element exploiting said first set of additional data;

modifying, in accordance with said modifying signal, the predetermined structural element and the structural elements associated therewith according to said data structure and said first set of additional data, thereby updating said data structure and said additional data, obtaining a corresponding modified three-dimensional graphic model, displaying said corresponding modified three-dimensional graphic model on a computer screen connected with said computer.

22. Computer system for the editing of three-dimensional graphic models, said computer system being configured to perform the following steps:

preparing a three-dimensional non-feature-based graphic model, including a plurality of structural elements, each associated with one or more of the other structural elements according to a data structure, said data structure including sufficient data for a complete description of said three-dimensional model, said data structure including geometry and topology information;

generating a first set of additional data, said additional data representing supplementary geometrical and/or positional and/or semantic data and relationships between said structural elements, said additional data not representing features and related parameters, constraints and relationships available in conventional feature-based graphic models;

receiving at least one modifying signal, representing a modification to be made on at least one predetermined structural element exploiting said first set of additional data;

modifying, in accordance with said modifying signal, the predetermined structural element and the structural elements associated therewith according to said data structure and said first set of additional data, thereby updating said data structure and said additional data, obtaining a corresponding modified three-dimensional graphic model.

* * * * *